(12) United States Patent
Kawahara et al.

(10) Patent No.: US 11,940,924 B2
(45) Date of Patent: Mar. 26, 2024

(54) MEMORY SYSTEM (71) Applicant: Kioxia Corporation, Tokyo (JP)

(72) Inventors: Takahiro Kawahara, Tokyo (JP); Mitsunori Tadokoro, Fujisawa Kanagawa (JP)

(73) Assignee: Kioxia Corporation, Tokyo (JP)

(*) Notice: Subject to any disclaimer, the term of this patent is extended or adjusted under 35 U.S.C. 154(b) by 0 days.

(21) Appl. No.: 17/696,753

(22) Filed: Mar. 16, 2022

(65) Prior Publication Data

US 2023/0085675 A1 Mar. 23, 2023

(30) Foreign Application Priority Data

Sep. 22, 2021 (JP) .................................. 2021-154473

(51) Int. Cl.
*G06F 12/0891* (2016.01)
*G06F 12/02* (2006.01)

(52) U.S. Cl.
CPC ...... *G06F 12/0891* (2013.01); *G06F 12/0246* (2013.01)

(58) Field of Classification Search
CPC .. G06F 12/0891; G06F 12/0246; Y02D 10/00
See application file for complete search history.

(56) References Cited

U.S. PATENT DOCUMENTS

| | | | | |
|---|---|---|---|---|
| 8,478,799 B2* | 7/2013 | Beaverson | ............ | G06F 16/188 |
| | | | | 707/823 |
| 11,483,205 B1* | 10/2022 | Jain | ...................... | H04L 41/0893 |
| 2016/0342509 A1* | 11/2016 | Kotte | .................. | G06F 12/0246 |
| 2020/0081660 A1 | 3/2020 | Cohen et al. | | |
| 2020/0081830 A1* | 3/2020 | Desai | .................. | G06F 12/0246 |
| 2020/0159425 A1 | 5/2020 | Flynn et al. | | |
| 2021/0042232 A1* | 2/2021 | Park | .................... | G06F 12/0873 |
| 2021/0064520 A1 | 3/2021 | Kanno | | |
| 2021/0165735 A1* | 6/2021 | Chung | ................ | G06F 12/0246 |
| 2022/0107887 A1* | 4/2022 | Kim | ..................... | G06F 12/0253 |
| 2023/0096420 A1* | 3/2023 | Das | ...................... | G06F 12/0253 |
| | | | | 711/154 |

* cited by examiner

*Primary Examiner* — Tasnima Matin
(74) *Attorney, Agent, or Firm* — Foley & Lardner LLP (57) ABSTRACT

A memory system according to an embodiment includes a memory system includes a nonvolatile memory and a memory controller. The nonvolatile memory includes blocks. The memory controller includes first and second tables, and first and second storage areas. The first table is managed in units of map segments. The second table includes first entries associated with a plurality of map segments included in the first table. The first storage area is configured to store a change history of the first table. The second storage area is configured to store a physical address of a block that is a storage destination of a copy of a changed map segment and a change history of the second table.

18 Claims, 6 Drawing Sheets

MEMORY SYSTEM

CROSS-REFERENCE TO RELATED APPLICATION

This application is based upon and claims the benefit of priority from prior Japanese Patent Application No. 2021-154473, filed Sep. 22, 2021, the entire contents of which are incorporated herein by reference.

FIELD

Embodiments described herein relate generally to a memory system.

BACKGROUND

NAND flash memories capable of storing data nonvolatilely are known.

DETAILED DESCRIPTION

In general, according to one embodiment, a memory system includes a nonvolatile memory and a memory controller. The nonvolatile memory includes a plurality of blocks. The memory controller is configured to access to the nonvolatile memory in response to an instruction from a host device to manage write and erase of the nonvolatile memory. The memory controller includes a first table, a second table, a first storage area, and a second storage area. The first table is managed in units of map segments associated with at least one of the blocks and is used to acquire a physical address of any of the blocks using a logical address as an index. The second table includes a plurality of first entries associated with a plurality of map segments included in the first table, and each of the first entries is a 1-bit entry indicating whether a trimming process for deleting invalid data is reserved for the associated map segments. The first storage area is configured to store a change history of the first table. The second storage area is configured to store a physical address of a block that is a storage destination of a copy of a changed map segment and a change history of the second table.

The embodiment will be described below with reference to the accompanying drawings. In the embodiment, a device and a method for embodying the technical concept of the invention are exemplified. The drawings are schematic or conceptual. In the following descriptions, the elements having substantially the same function and configuration are denoted by the same numeral or sign. The number added to the numeral or sign is used to distinguish elements having the same configuration.

Embodiment

Below is a description of an information processing system 1 according to the embodiment.

[1] CONFIGURATION

[1-1] Configuration of Information Processing System 1

Figure 1:
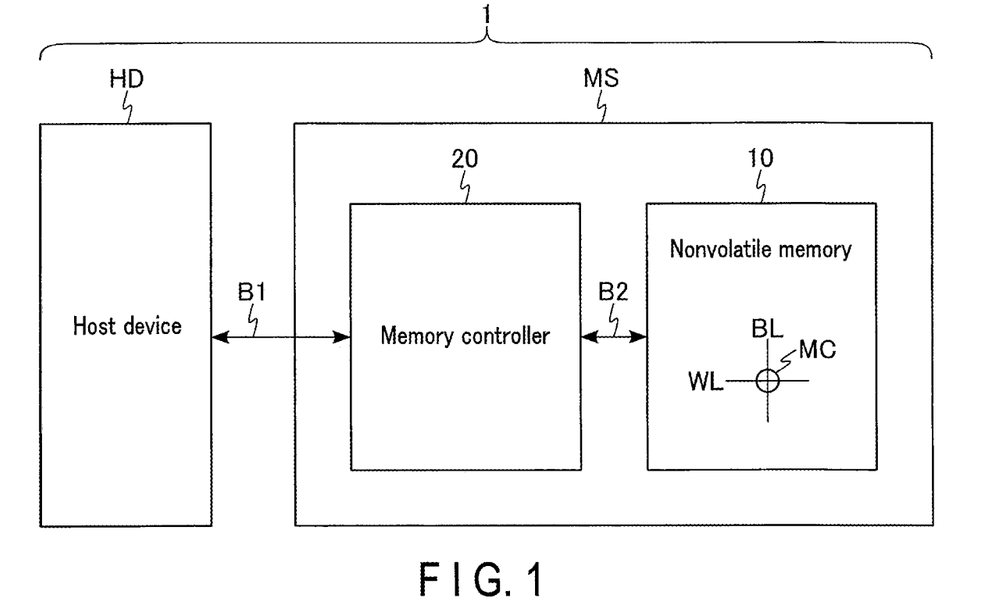
FIG. 1 is a block diagram showing an example of a configuration of an information processing system according to an embodiment.

FIG. 1 is a block diagram showing an example of the configuration of the information processing system 1 according to the embodiment. The information processing system 1 includes a host device HD and a memory system MS. The host device HD is an electronic device such as a personal computer, a portable information terminal and a server. The memory system MS is a semiconductor storage device such as a memory card and a solid state drive (SSD). The memory system MS includes a nonvolatile memory 10 and a memory controller 20. The host device HD and the memory controller 20 are connected to each other via a bus B1. The nonvolatile memory 10 and the memory controller 20 are connected to each other via a bus B2. Note that the host device HD and the memory controller 20 may be connected via a network.

The nonvolatile memory 10 is a memory device that stores data nonvolatilely. The nonvolatile memory 10 is, for example, a NAND flash memory, a NOR flash memory, a magneto-resistive random access memory (MRAM), a phase change random access memory (PRAM), a resistive random access memory (ReRAM) and a ferroelectric random access memory (FeRAM). The nonvolatile memory 10 will be described as a NAND flash memory. The nonvolatile memory 10 includes a plurality of memory cells MC, a plurality of bit lines BL and a plurality of word lines WL. Each of the memory cells MC stores at least one-bit data nonvolatilely. Each of the memory cells MC is associated with one bit line BL and one word line WL. Each of the memory cells MC is identified based on an address for identifying the word line WL and an address for identifying the bit line BL. Hereinafter, storing (writing) data in (to) the nonvolatile memory 10 will also be referred to as "nonvolatility."

The memory controller 20 is a control device that controls the nonvolatile memory 10. The memory controller 20 is, for example, a semiconductor integrated circuit configured as a system on a chip (SoC). The memory controller 20 receives a command from the host device HD to control the nonvolatile memory 10 and perform a data read operation, a data write operation, a data erase operation and the like. The memory controller 20 may collectively manage a plurality of nonvolatile memories 10. In addition, the memory controller 20 has a power loss protection (PLP) function. The configuration and operation for achieving the PLP function will be described later.

[1-2] Hardware Configuration of Memory System MS

[1-2-1] Hardware Configuration of Nonvolatile Memory 10

Figure 2:
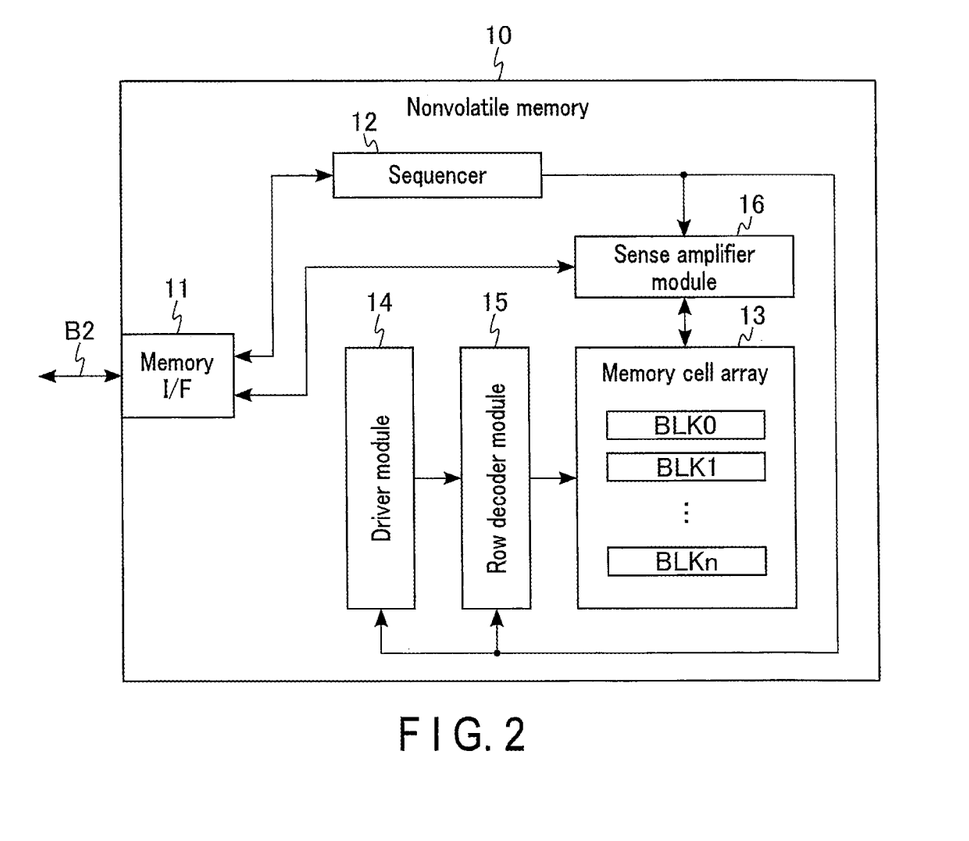
FIG. 2 is a block diagram showing an example of a hardware configuration of a nonvolatile memory according to the embodiment.

FIG. 2 is a block diagram showing an example of the hardware configuration of the nonvolatile memory 10 according to the embodiment. The nonvolatile memory 10 includes, for example, a memory interface (memory I/F) 11, a sequencer 12, a memory cell array 13, a driver module 14, a row decoder module 15 and a sense amplifier module 16.

The memory I/F 11 is a hardware interface connected to the memory controller 20 via the bus B2. The memory I/F 11 performs communication conforming to the interface standard between the nonvolatile memory 10 and the memory controller 20. The interface standard supported by the memory I/F 11 is, for example, the NAND interface standard.

The sequencer 12 is a control circuit that controls the entire operation of the nonvolatile memory 10. The sequencer 12 receives a command through the memory I/F 11 to control the driver module 14, row decoder module 15, sense amplifier module 16 and the like and perform a read operation, a write operation, an erase operation and the like.

The memory cell array 13 is a storage circuit including a set of memory cells MC. The memory cells MC may be arranged two-dimensionally or three-dimensionally. The memory cell array 13 includes a plurality of blocks BLK0 to BLKn (n is an integer of 1 or more). The block BLK is used as, for example, a data erase unit. The block BLK includes a plurality of pages. Each of the pages is a data read unit and a data write unit. Each page corresponds to, for example, data stored in memory cells MC connected to one word line WL. Note that the memory cells MC connected to one word line WL may store data of a plurality of pages according to the number of bits of data stored in each of the memory cells MC.

The driver module 14 is a driver circuit that generates a voltage to be used in a read operation, a write operation, an erase operation and the like. The driver module 14 is connected to the row decoder module 15 via a plurality of signal lines. The driver module 14 may receive a page address through the memory I/F 11 to change a voltage to be applied to each of the signal lines.

The row decoder module 15 is a decoder that decodes a row address received through the memory I/F. Based on a result of the decoding, the row decoder module 15 selects a row direction (one block BLK) of the memory cell array 13. Then, the row decoder module 15 transfers the voltages, which are applied to the signal lines, to a plurality of interconnects (such as the word lines WL) provided in the selected block BLK.

The sense amplifier module 16 is a sense circuit that senses data read from the selected block BLK, based on the voltage of the bit lines BL, during a read operation. The sense amplifier module 16 transmits the read data to the memory controller 20 via the memory I/F 11. In addition, the sense amplifier module 16 may apply a voltage corresponding to data to be written to the memory cell MC, to each of the bit lines BL during a write operation.

[1-2-2] Hardware Configuration of Memory Controller 20

Figure 3:
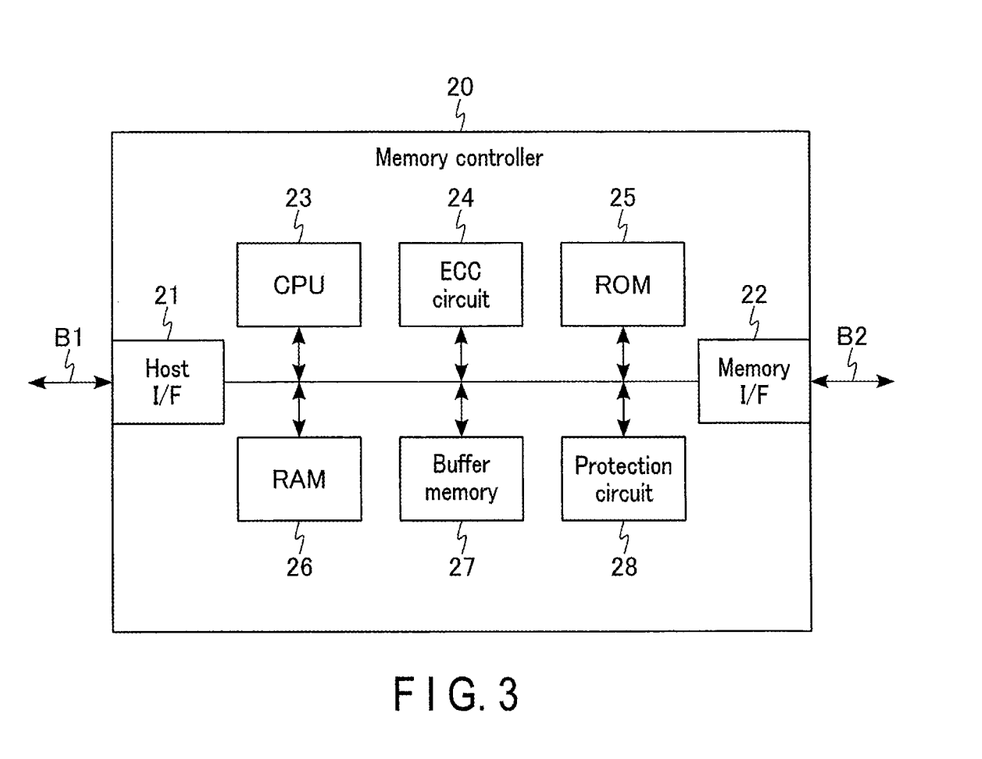
FIG. 3 is a block diagram showing an example of a hardware configuration of a memory controller according to the embodiment.

FIG. 3 is a block diagram showing an example of the hardware configuration of the memory controller 20 according to the embodiment. The memory controller 20 includes a host interface (host I/F) 21, a memory interface (memory I/F) 22, a central processing unit (CPU) 23, an error correction code (ECC) circuit 24, a read only memory (ROM) 25, a random access memory (RAM) 26, a buffer memory 27 and a protection circuit 28.

The host I/F 21 is a hardware interface connected to the host device HD via the bus B1. The host I/F 21 performs communication that conforms to the interface standard between the host device HD and the memory controller 20. The interface standard supported by the host I/F 21 includes serial advanced technology attachment (SATA), PCI express (PCIe™) and the like.

The memory I/F 22 is a hardware interface connected to the nonvolatile memory 10 via the bus B2. The memory I/F 22 performs communication that conforms to the interface standard between the nonvolatile memory 10 and the memory controller 20. The interface standard supported by the memory I/F 22 is, for example, the NAND interface standard.

The CPU 23 is a processor. The CPU 23 controls the entire operation of the memory controller 20. The CPU 23 receives a write request via the host I/F 21 to instruct the nonvolatile memory 10 to write data via the memory I/F 22. The CPU 23 receives a read request via the host I/F 21 to instruct the nonvolatile memory 10 to read data via the memory I/F 22.

The ECC circuit 24 is a circuit that performs ECC processing. The ECC processing includes data encoding and decoding. The ECC circuit 24 encodes data to be written to the nonvolatile memory 10 and decodes data read from the nonvolatile memory 10.

The ROM 25 is a nonvolatile memory. The ROM 25 is, for example, an electrically erasable programmable read-only Memory (EEPROM™). The ROM 25 stores programs such as firmware. For example, the operation of the memory controller 20, which will be described later, is performed by the CPU 23 executing the firmware of the ROM 25.

The RAM 26 is a volatile memory. The RAM 26 is, for example, a dynamic random access memory (DRAM) and a static random access memory (SRAM). The RAM 26 is used as a work area of the CPU 23. The RAM 26 stores a management table such as a lookup table (LUT) that associates a logical address and a physical address with each other. The management table is a type of system data of the memory system MS. The LUT may be referred to as an "address translation table" and a "logical address/physical address translation table."

The buffer memory 27 is a volatile memory. The buffer memory 27 includes a dynamic random access memory (DRAM), a static random access memory (SRAM) and the like. The buffer memory 27 receives data via the host I/F 21 to temporarily store the data (hereinafter referred to as write buffer data) and receives data via the memory I/F 22 to temporarily store the data. The buffer memory 27 may be externally connected to the memory controller 20.

The protection circuit 28 is a backup circuit. The protection circuit 28 detects a power loss of the memory system MS. The protection circuit 28 includes a PLP capacitor. The PLP capacitor is, for example, an electric double layer capacitor, a conductive polymer aluminum electrolytic capacitor, and a conductive polymer tantalum solid electrolytic capacitor. The PLP capacitor supplies a power supply voltage to the memory system MS for a fixed period time after the power supply to the memory system MS is cut off. The PLP capacitor is used as a backup power supply when the power of the memory system MS is lost. The capacity of the PLP capacitor is designed to be capable of charging energy capable of fulfilling the PLP function. Note that the PLP capacitor may be externally connected to the memory controller 20.

[1-3] Functional Configuration of Memory System MS

[1-3-1] Functional Configuration of Nonvolatile Memory 10

Figure 4:
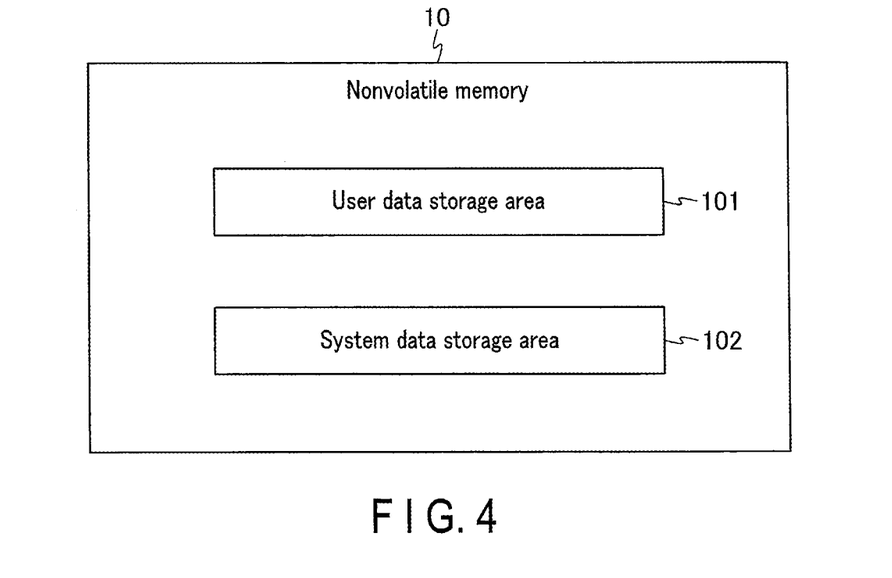
FIG. 4 is a block diagram showing an example of a functional configuration of the nonvolatile memory according to the embodiment.

FIG. 4 is a block diagram showing an example of the functional configuration of the nonvolatile memory 10 according to the embodiment. The nonvolatile memory 10 includes a user data storage area 101 and a system data storage area 102. The user data storage area 101 and the system data storage area 102 are each a storage area configured by at least one block BLK.

The user data storage area 101 is an area that stores user data. The user data is, for example, data received from the host device HD by the memory system MS.

The system data storage area 102 is an area that stores system data. The system data stored in the system data storage area 102 includes a copy (snapshot) of a master table, data associated with the master table and the like. The master table is a table for use in managing the storage areas of the nonvolatile memory 10. The master table includes a management table such as an address translation table.

[1-3-2] Functional Configuration of Memory Controller 20

Figure 5:
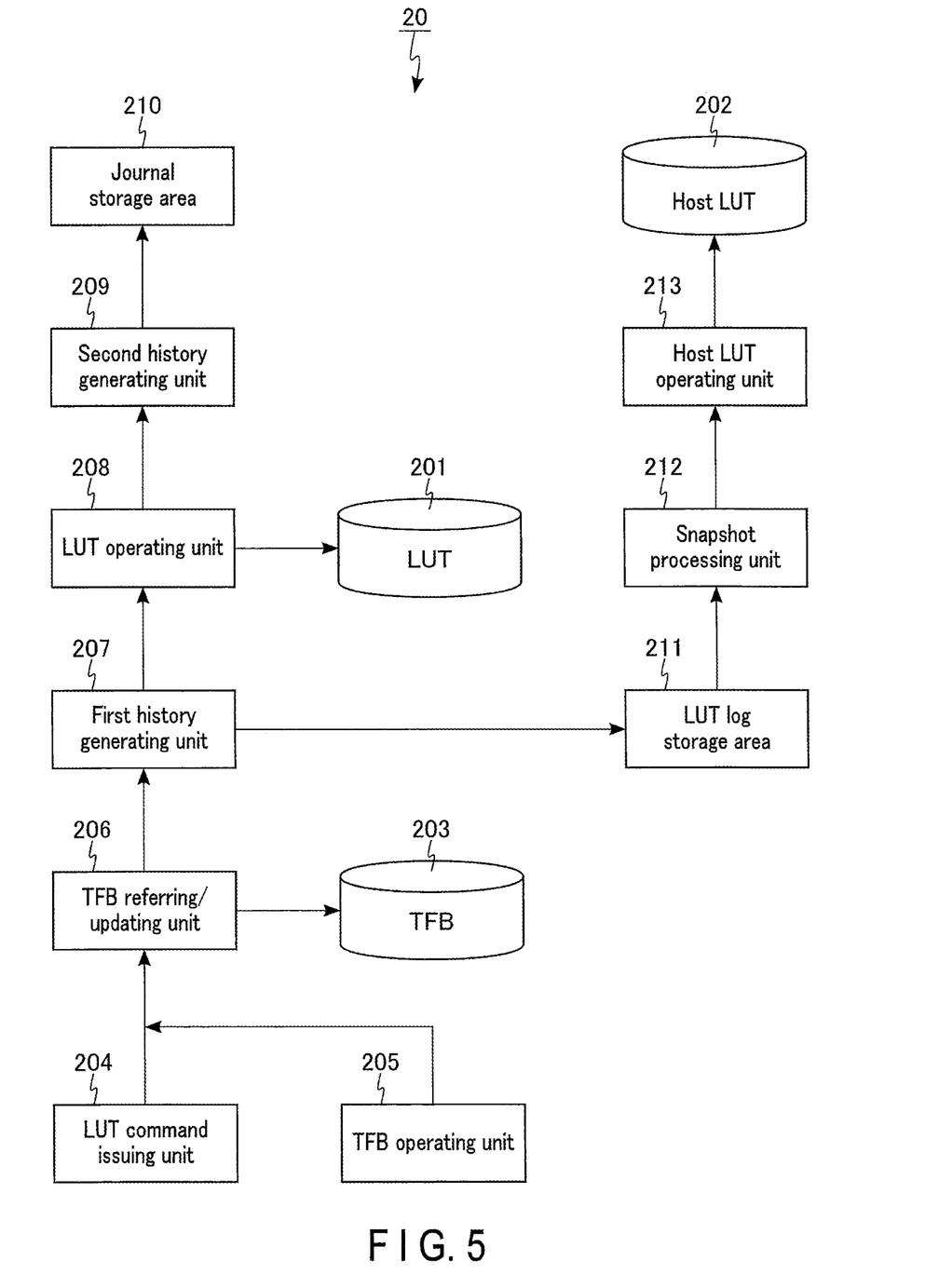
FIG. 5 is a block diagram showing an example of a functional configuration of the memory controller according to the embodiment.

FIG. 5 is a block diagram showing an example of the functional configuration of the memory controller 20 according to the embodiment. In FIG. 5, the arrows indicate the flows of control information (control commands). The memory controller 20 includes a lookup table (LUT) 201, a host lookup table (host LUT) 202, a trimmed flag bitmap (TFB) 203, an LUT command issuing unit 204, a TFB operating unit 205, a TFB referring/updating unit 206, a first history generating unit 207, an LUT operating unit 208, a second history generating unit 209, a journal storage area 210, an LUT log storage area 211, a snapshot processing unit 212 and a host LUT operating unit 213.

The LUT 201 is a table having a logical cluster address (LCA) as an index. Each entry of the LUT 201A stores a media cluster address (MCA). The MCA is a physical address indicating a storage destination of the user data (cluster) written to the media. When the memory controller 20 reads user data from the nonvolatile memory 10, it gains access to the LUT 201 using the LBA (LCA) of a command issued by the host device HD as an index to acquire an MCA. Then, the memory controller 20 reads the acquired MCA. When the memory controller 20 writes user data to the nonvolatile memory 10, it specifies an MCA of the medium to which the user data managed in the memory controller 20 can be written. Then, the memory controller 20 writes the user data to the specified MCA. After that, the memory controller 20 uses the LBA (LCA) of the written user data as an index to update the entry of the LUT 201 to the MCA to which the user data is written.

Note that LCA is an address in which logical block addresses (LBA) are grouped into a cluster. The cluster is, for example, 4 KiB user data continuing from the start LBA, and is the smallest unit of address management on the media. The media is also called a super block, and is a collection of a plurality of blocks BLK (that is, a plurality of physical block addresses (PBA) allocated to the nonvolatile memory 10). An SSD (memory system MS) manages writing/erasing of a NAND flash memory (nonvolatile memory 10) in superblock units. The nonvolatility units obtained by evenly dividing the LUT 201 is called map segments. The number of clusters included in each of the map segments is, for example, 60. If 1 cluster is equal to 4 KiB, then 60 clusters is equal to 240 KiB. The LUT 201 is updated each time user data (cluster) is written to the user data storage area 101 of the nonvolatile memory 10. The memory controller 20 manages the updated portion of the LUT 201 on a map segment basis and sequentially makes the latest map segment nonvolatile in the system data storage area 102. Note that the LUT 201 may be referred to as a "map table." The superblocks may be referred to as "block groups."

The host LUT 202 is a table for storing the address of the storage destination of the snapshot of the map segment of the LUT 201. Each entry of the host LUT 202 has an MCA and a media segment address (MSA) represented by a segment offset within the cluster of the MSA. The snapshot (copy) of the map segment of the LUT 201 is stored in the system data storage area 102 of the nonvolatile memory 10. The host LUT 202 is updated each time the map segment of the LUT 201, which is updated by writing the user data (cluster), is made nonvolatile. The memory controller 20 refers to the host LUT 202 when the memory system MS is started (powered on) to read, for example, snapshots of all map segments into the RAM 26. When the RAM 26 has no area for storing snapshots of all map segments, the memory controller 20 appropriately reads the snapshot of a map segment to be used from the nonvolatile memory 10 into the RAM 26. The host LUT 202 may be restored from a copy of the LUT log storage area 211, which is stored in the system data storage area 102 of the nonvolatile memory 10. Therefore, the snapshot of the host LUT 202 need not be stored in the nonvolatile memory 10. Note that the host LUT 202 may be called a "MoM (map of map) table." When 1 map segment is equal to 64 clusters, the storage capacity of the host LUT 202 is ⅟₆₄ of the storage capacity of the LUT 201.

The TFB 203 is a 1 entry=1 bit table indicating a storage area reserved for a trimming process. The TFB 203 covers at least all the entries of the host LUT 202. The trimming process is performed on a map segment basis to delete data (invalid data) from a storage area that is reported as unused by the host device HD. Each of the entries of the TFB 203 is associated with each of the entries of the host LUT 202, i.e., each of the map segments of the LUT 201. When "0" is stored, each entry of the TFB 203 indicates that there is no pending trim request for the associated map segment. When "1" is stored, each entry of the TFB 203 indicates that there is a pending trim request for the associated map segment. The map segment with the trim request corresponds to the map segment notified by the host device HD that unused (invalid data) is stored. The memory controller 20 reflects the trim request received from the host device HD on the entry of the TFB 203 to make it possible to cause the trimming process to proceed in the background of the processing of other commands. The area where the trimming process is not executed is always represented in the TFB 203. For this reason, when the memory system MS needs to be urgently powered off such as power loss, the memory controller 20 preferably makes information about the TFB 203 nonvolatile such that the TFB 203 can be restored. Each entry of the TFB 203 may be referred to as a "trim flag." The "trim request" may be referred to as a "deallocate request." The "trimming process" may be referred to as a "deallocate process." Hereinafter, a map segment for which a trim request is made will also be referred to as a "trim reservation range."

The LUT command issuing unit 204 issues a command for instructing the LUT 201 to reference or update the table. The reference of the LUT 201 corresponds to acquisition of the MCA of an entry targeted by the LCA. The update of the LUT 201 corresponds to rewriting the MCA of an entry targeted by the LCA. The LUT command issuing unit 204 instructs the LUT 201 to be updated, for example, when the writing of user data is completed.

The TFB operating unit 205 issues a command for instructing the TFB referring/updating unit 206 to update the bit of each entry of the TFB 203. Specifically, upon receiving a trim request (trim command) from the host device HD, the TFB operating unit 205 issues a command for setting "1" to the bit of an entry to make the trim request in the TFB 203. In other words, the memory controller 20 instructs the TFB referring/updating unit 206 to update the TFB 203 (set a trim reservation range) based on the trim request from the host device HD. When a trimming process is performed, the TFB operating unit 205 issues a command for setting "0" to the bit of an entry to perform the trimming process in the TFB 203. In other words, the memory controller 20 instructs the TFB referring/updating unit 206 to update the TFB 203 (clear the trim reservation range) when a trimming process is performed in the trim reservation range.

The TFB referring/updating unit 206 processes the command issued by the LUT command issuing unit 204 and the command issued by the TFB operating unit 205. Specifically, when the TFB referring/updating unit 206 receives a command (LUT reference command) for instructing the unit 206 to refer to the LUT 201, it refers to the TFB 203 first. Then, when the bit of an entry to be referred to is "1," the TFB referring/updating unit 206 adds the information to the LUT reference command and delivers it to the processing unit (for example, the first history generating unit 207) in the subsequent stage. In addition, when the TFB referring/updating unit 206 receives a command (LUT update command) for instructing the unit 206 to update the LUT 201, if the bit associated with an entry to update the LUT 201 in the TFB 203 is "1," the unit 206 updates the bit to "0" (clears the trim reservation range). Then, the TFB referring/updating unit 206 adds the command for processing a pending trim request to the LUT update command and delivers it to the processing unit in the subsequent stage. If the bit associated with an entry to update the LUT 201 in the TFB 203 is already "0," the TFB referring/updating unit 206 does not update the TFB 203 and delivers a command (LUT update command) for instructing the unit 206 to update the LUT 201 as it is to the processing unit (for example, the first history generating unit 207) in the subsequent stage. In addition, the TFB referring/updating unit 206 can set "1" to the bit of each entry of the TFB 203 (set a trim reservation range) in accordance with a command issued by the TFB operating unit 205.

The first history generating unit 207 stores information indicating which map segment of the LUT 201 has been updated (or reserved for update). The first history generating unit 207 also monitors the free state of the journal storage area 210 and the number of valid entries in the LUT log storage area 211. In order to prevent the journal storage area 210 from becoming full, the first history generating unit 207 selects the oldest one from among the map segments of the updated LUT 201 and adds to the LUT log storage area 211 an entry indicating a write request for snapshots of the map segments. The first history generating unit 207 erases a map segment whose writing is requested to the LUT log storage area 211 from the storage in the first history generating unit 207. The first history generating unit 207 also stores information of a command for processing a pending trim request, which is added to a command for instructing update of the LUT 201 (LUT update command), together with information of the map segment updated as a 1-bit flag. When the first history generating unit 207 processes the command issued by the TFB operating unit 205 to update the entry of the TFB 203 to "1," it first adds all the map segments of the updated LUT 201 stored in the first history generating unit 207 to the LUT log storage area 211, and then adds the information of the command to update the entry of the TFB 203 to "1" to the LUT log storage area 211. When the first history generating unit 207 stores the updated map segment, it also stores the entry position of a journal in which the execution history of the LUT command for updating the map segment is recorded. This information is used to specify a range of invalidable entries of the journal storage area 210.

The LUT operating unit 208 updates each entry of the LUT 201 in response to a command issued by the LUT command issuing unit 204 or a command issued by the TFB referring/updating unit 206 to process a pending trim request.

The second history generating unit 209 generates a change history of the LUT 201 and stores it in the journal storage area 210. In other words, the second history generating unit 209 causes the journal storage area 210 to store the update of each entry (MCA) of the LUT 201 together with the update result of the LUT 201.

The journal storage area 210 is a cyclic buffer. The journal storage area 210 mainly stores a change history of the LUT 201 related to access to the nonvolatile memory 10 based on the instruction of the host device HD and access to the nonvolatile memory 10 accompanying the operation of garbage collection or the like. Specifically, the journal storage area 210 stores information of an address that stores user data (cluster). In other words, the journal storage area 210 stores a change history (update information) of each entry of the LUT 201. After the first history generating unit 207 adds a write request for map segments to the LUT log storage area 211, that is, after the snapshot processing of each of the map segments is reserved, the journal storage area 210 records information of the updated entry in the map segment. The change history of the LUT 201 stored in the journal storage area 210 is used to restore the LUT 201 to its latest state from the snapshot of the map segment in nonvolatile state. The entries of the journal storage area 210 are released based on information of the invalidable entries indicated by the LUT log storage area 211.

The LUT log storage area 211 is a cyclic buffer. The LUT log storage area 211 stores a history of reservation for writing snapshots of map segments (map segment write history) and a change history of the TFB 203. The information stored in the LUT log storage area 211 is appropriately made nonvolatile together with the snapshot processing of the map segments. The map segment write history indicates information about which entry in the journal storage area 210 is associated with the snapshot of a map segment to be nonvolatile, that is, information indicating a range in which the entries in the journal storage area 210 can be invalidated and information for updating the host LUT 202 after the snapshot of the map segment is made nonvolatile, that is, the entry number (map segment number) of the host LUT 202 and the address information of a write destination of the map segment. Note that the storage capacity of the journal storage area 210 is larger than that of the LUT log storage area 211. When the journal storage area 210 has, for example, 64-K entries, the LUT log storage area 211 has about 8-K entries. In the LUT log storage area 211, when entries are accumulated to some extent, valid entries are made nonvolatile by snapshot processing and released. When it is assumed that 1 map segment is equal to 64 clusters, if sequential write access occurs, the journal storage area 210 stores 64-K entries while 1-K entries are stored in the LUT log storage area 211. Therefore, the capacity of the LUT log storage area 211 may be smaller than that of the journal storage area 210.

The snapshot processing unit 212 performs snapshot processing when the number of valid entries in the LUT log storage area 211 exceeds a predetermined threshold. The snapshot processing is an operation of making the snapshots (copies) of the map segments of the LUT 201 nonvolatile. In the snapshot processing, the snapshot processing unit 212 makes the map segments of the LUT 201 indicated by the entries of the LUT log storage area 211 nonvolatile. That is, the snapshot processing unit 212 sequentially makes the updated LUT 201 nonvolatile in map segment units. Thus, even if the LUT 201 is a large table, the time for snapshot processing can be shortened. In parallel with the sequential nonvolatile processing of snapshots of the map segments, the snapshot processing unit 212 also sequentially makes the information in the LUT log storage area 211 nonvolatile from the old one. The nonvolatile information of the LUT log storage area 211 is read out of the nonvolatile memory 10 when the memory system MS is started, and is used to restore the host LUT 202 and TFB 203.

The host LUT operating unit 213 updates each entry of the host LUT 202 based on the result of the snapshot processing, that is, the information of the LUT log storage area 211.

[1-4] Configuration of Entries Stored in RAM 26

[1-4-1] Configuration of Entries Stored in Journal Storage Area 210

Figure 6:
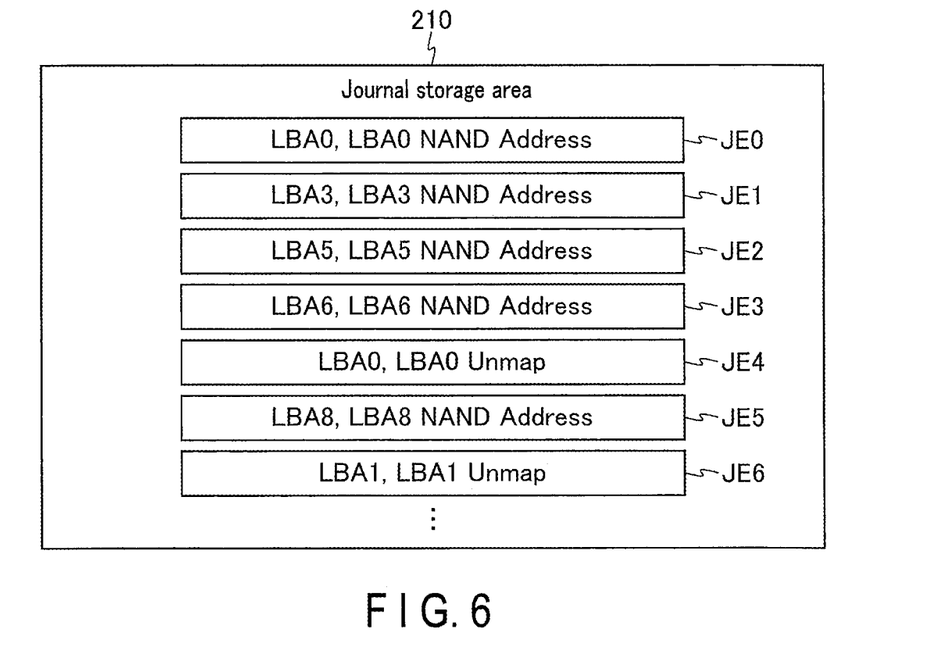
FIG. 6 is a block diagram showing an example of entries stored in a journal storage area provided in the memory controller according to the embodiment.

FIG. 6 is a block diagram showing an example of entries stored in the journal storage area 210 provided in the memory controller 20 according to the embodiment. The journal storage area 210 stores, for example, entries JE0 to JE6. Each of the entries JE stores, for example, the parameters of the LUT update command. The LUT update command includes, as parameters, for example, LCA information as an index of the LUT 201, an address (MCA) of a storage destination of user data, and a trimming process performance request held in the TFB 203. The "trimming process performance request held in the TFB 203" also indicates that the trim flag is cleared from "1" to "0" in the TFB 203.

"LBA0, LBA0 NAND Address" of entry JE0 indicates that the address in which the user data of "LBA0" is stored is "LBA0 NAND Address (e.g., MCA0)." "LBA0" represents the 0th LCA (LCA0). The respective parameters of entries JE1, JE2, JE3, JE5 and JE6 are similar to those of entry JE0 except for the associated address.

The "LBA0, LBA0 Unmap" of entry JE4 indicates that the address at which the user data of "LBA0" is stored is set to "LBA0 Unmap." The address set to "Unmap" indicates that the trimming process has been performed, that is, data has been erased. The parameters of entry JE6 are similar to those of entry JE4 except for the associated address.

[1-4-2] Configuration of Entries Stored in LUT Log Storage 211

Figure 7:
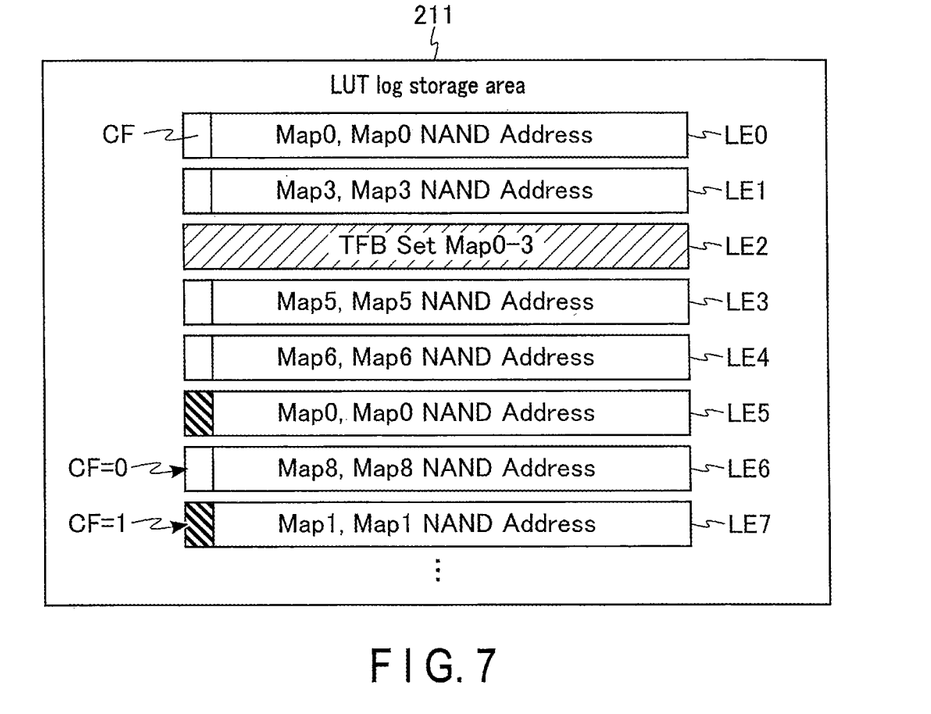
FIG. 7 is a block diagram showing an example of entries stored in an LUT log storage area provided in the memory controller according to the embodiment.

FIG. 7 is a block diagram showing an example of entries stored in the LUT log storage area 211 provided in the memory controller 20 according to the embodiment. The LUT log storage area 211 stores entries LE0 to LE7, for example. Below is a description of an example in which 1 map segment is equal to 1 cluster.

"Map0, Map0 NAND Address" of entry LE0 indicates that the address at which a snapshot corresponding to "Map0" is stored is "Map0 NAND Address." "Map0" represents the 0th map segment. Entry LE0 includes a clear flag CF.

The clear flag CF is a 1-bit flag indicating whether a bit corresponding to a map segment to be snapped has been cleared in the TFB 203. Since the map segment to be cleared is also updated when the trim flag of the TFB 203 is cleared (reset), the clear flag CF is added to the entry LE associated with the updated map segment in the LUT log storage area 211. "CF=1" indicates that the performance of a trimming process has been requested to a map segment to be requested for nonvolatile snapshot, that is, the trim flag associated with the map segment has been cleared (reset). "CF=0" indicates that the performance of a trimming process has not been requested for a map segment for which nonvolatile snapshot, that is, the trim flag associated with the map segment has not been cleared. In other words, the clear flag CF indicates whether the entry information of the TFB 203 associated with the updated map segment has been changed from "1" to "0." The parameters of entries LE1, LE3, LE4, LE5, LE6 and LE7 are similar to entry LE0 except for the associated address and the parameter of the clear flag CF.

"TFB Set Map 0-3" of entry LE2 indicates that a trim flag has been set for "Map 0-3." In other words, "TFB Set Map 0-3" indicates that "1" is stored in a plurality of bits associated with the 0th to third map segments in the TFB 203 (that a trim flag is set). Thus, information about the setting of a trim flag is stored in a single entry in the LUT log storage area 211. One entry LE of the LUT log storage area 211 can store information about the setting of a trim flag for a plurality of consecutive bits in the TFB 203. In other words, a single entry LE in the LUT log storage area 211 may specify two or more entries in the TFB 203 in a range to indicate that a trim flag has been set.

As described above, the LUT log storage area 211 can store information about setting of a trim flag (e.g., entry LE2) and information about clearing of a trim flag (clear flag CF) as a change history of the TFB 203. Since the information about setting/clearing of a trim flag of the TFB 203 is 1-bit information added to the map segment, it is convenient to store it in the nonvolatile memory 10 together with a snapshot of the map segment. When 1 map segment is equal to 64 clusters, the 0th to the 63rd LCAs correspond to the 0th map segment, and the 64th to the 127th LCAs correspond to the first map segment. The number of LCAs assigned to one map segment can be changed. Although not shown in FIG. 7, each entry in the LUT log storage area 211 may also include positional information of an entry in the journal storage area 210 associated with a map segment, in addition to the number of the map segment and the clear flag CF.

[2] OPERATION

The memory controller 20 causes the nonvolatile memory 10 to store data of the buffer memory 27, system data of the memory system MS, etc. while the PLP capacitor of the protection circuit 28 is operating as a backup power source. Accordingly, the memory system MS is restored to the state immediately before the power loss, and the PLP function is achieved.

In addition, the memory system MS according to the embodiment can perform a history recording operation and a backup operation. The history recording operation is an operation of recording of a change history of system data. The backup operation is an operation of backing up system data, write buffer data, and the like to the nonvolatile memory 10 at the time of power loss. The history recording operation and the backup operation will be described below in detail.

[2-1] History Recording Operation

Figure 8:
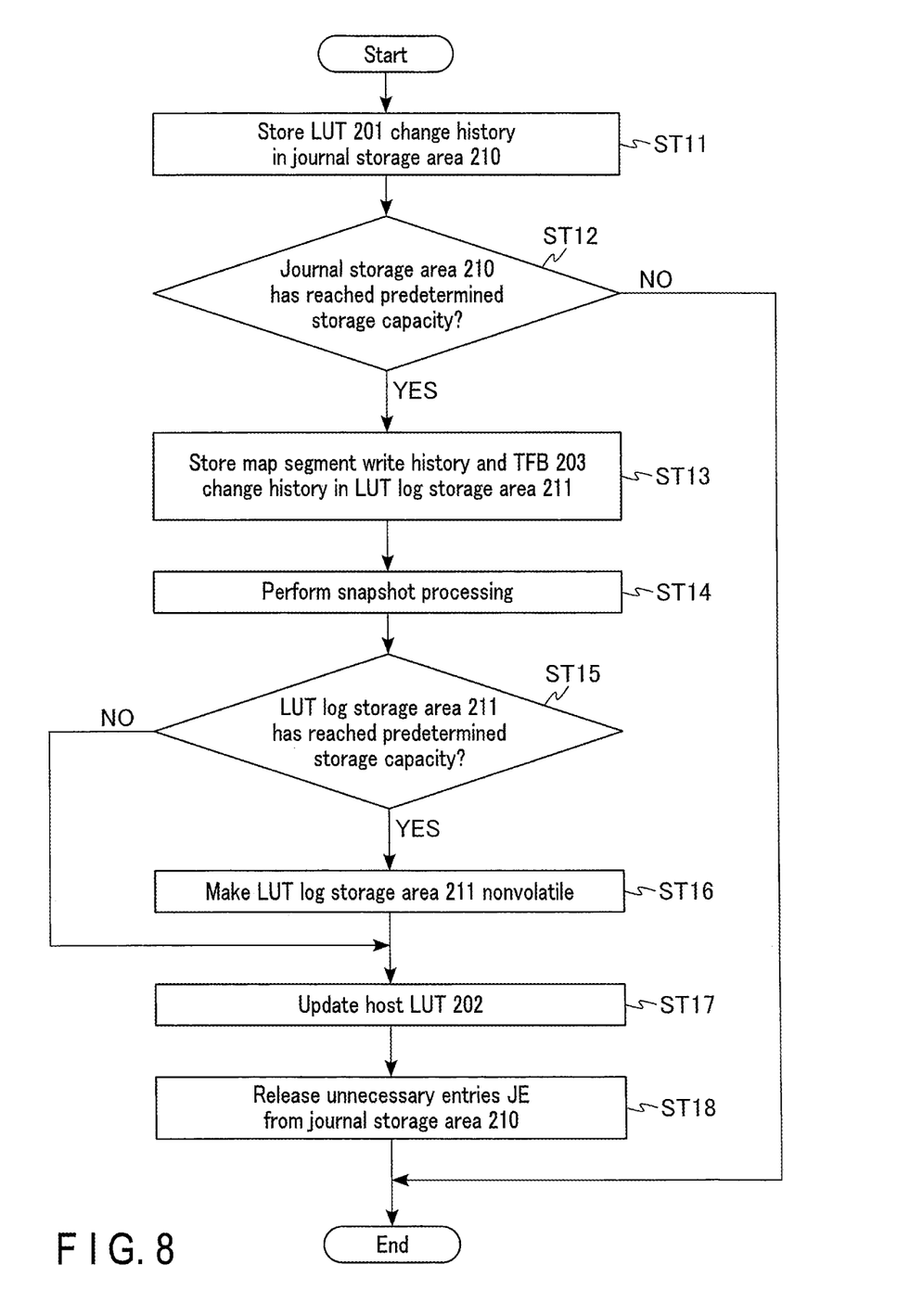
FIG. 8 is a flowchart showing an example of a history recording operation of the memory controller according to the embodiment.

FIG. 8 is a flowchart showing an example of a history recording operation of the memory controller 20 according to the embodiment. The example will be described below with reference to FIG. 8.

When the LUT 201 is changed by access to the nonvolatile memory 10 based on an instruction from the host device HD, by access to the nonvolatile memory 10 accompanying an operation such as garbage collection, and the like, the memory controller 20 starts a history recording operation (Start).

When the memory controller 20 starts a history recording operation, it causes the first history generating unit 207 to store the number of a map segment to be updated and causes the journal storage area 210 to store a change history of the LUT 201 (step ST11). The change history of the LUT 201 in ST11 corresponds to the change history of the LUT 201 caused by access to the nonvolatile memory 10. In step ST11, an LUT update command is issued, the number of a map segment updated by the command is stored in the first history generating unit 207, and the execution result of the LUT update command is stored in the journal storage area 210.

Then, the memory controller 20 checks whether the journal storage area 210 has reached a predetermined storage capacity or whether there is no more space in the storage area of the first history generating unit 207 (step ST12). In other words, the memory controller 20 determines whether a valid entry in the journal storage area 210 has exceeded a predetermined storage capacity or whether there is no more space in the storage area of the first history generating unit 207. The "predetermined storage capacity" in step ST12 is appropriately set according to the storage capacity of the journal storage area 210.

When the journal storage area 210 has reached a predetermined storage capacity or when there is no more space in the storage area of the first history generating unit 207 (YES in step ST12), the memory controller 20 proceeds to step ST13.

When the journal storage area 210 has not reached a predetermined storage capacity but when there is an empty space in the storage area of the first history generating unit 207 (NO in step ST12), the memory controller 20 terminates a series of steps shown in FIG. 8 (End).

In step ST13, the memory controller 20 causes the LUT log storage area 211 to store a write history of map segments and a change history of the TFB 203. The write history of map segments includes the number of a map segment including a portion of the LUT 201 that has been changed due to access to the nonvolatile memory 10. The change history of the TFB 203 (the set/reset of a trim flag) is based upon the number of a map segment for a trim request received from the host device HD or the number of a map segment in which the memory controller 20 has performed a trimming process.

When step ST13 is completed, the memory controller 20 performs the snapshot processing (step ST14). In the snapshot processing, the memory controller 20 makes the snapshot of a map segment, which is designated based on the map segment write history of the LUT log storage area 211, nonvolatile. Accordingly, the snapshot (copy) of a map segment indicated by each entry LE of the LUT log storage area 211 is stored in the system data storage area 102 of the nonvolatile memory 10. In other words, in step ST14, the snapshot of a map segment containing an LCA targeted by an entry of the journal storage area 210 is made nonvolatile.

When step ST14 is completed, the memory controller 20 checks whether the LUT log storage area 211 has reached a predetermined storage capacity (step ST15). In other words, the memory controller 20 determines whether a valid entry of the LUT log storage area 211 has exceeded a predetermined storage capacity. The "predetermined storage capacity" in step ST15 is appropriately set according to the storage capacity of the LUT log storage area 211.

When the LUT log storage area 211 has reached a predetermined storage capacity (YES in step ST15), the memory controller 20 proceeds to step ST16.

When the LUT log storage area 211 has not reached a predetermined storage capacity (NO in step ST15), the memory controller 20 proceeds to step ST17.

In step ST16, the memory controller 20 makes the LUT log storage area 211 nonvolatile. Specifically, the memory controller 20 causes the system data storage area 102 of the nonvolatile memory 10 to store the map segment write history stored in the LUT log storage area 211 and the change history of the TFB 203.

When step ST16 is completed, the memory controller 20 updates the host LUT 202 (step ST17). The update contents of the host LUT 202 are based on the map segment write history of the LUT log storage area 211. That is, the address at which the snapshot of a map segment is stored is stored in its corresponding entry in the host LUT 202 by the snapshot processing. When the snapshot processing is performed (step ST14) and the host LUT 202 is updated (step ST17), the LUT update command history on the journal storage area 210 becomes unnecessary.

When step ST17 is completed, the memory controller 20 releases unnecessary entries JE from the journal storage area 210 (step ST18). In other words, in step ST18, the memory controller 20 releases (invalidates) all entries JE prior to the entry JE of the journal storage area 210 associated with the nonvolatile snapshot. Accordingly, a free entry is formed in the journal storage area 210.

When step ST18 is completed, the memory controller 20 terminates a series of steps shown in FIG. 8.

As described above, in the history recording operation of the memory system MS according to the embodiment, when the LUT 201 is updated, the journal storage area 210 decreases in free entry (step ST11) and the LUT log storage area 211 increases in valid entry (step ST13). Then, in order to create a free entry in the journal storage area 210, snapshot processing is performed according to the map segment write history stored in the LUT log storage area 211 (step ST14). After the snapshot processing is periodically performed, the LUT log storage area 211 is made nonvolatile appropriately to make the change history of the TFB 203 nonvolatile (step ST16). Note that the change history of the LUT 201 stored in the journal storage area 210 is not made nonvolatile in the history recording operation.

Here is a brief description of an operation related to the change history of the TFB 203 stored in the LUT log storage area 211 in step ST13. The memory controller 20 clears a bit (trim flag) associated with a map segment to be trimmed in the TFB 203 when the trimming is performed in the background of an operation based on an instruction from the host device HD. Upon receiving from the host device HD a write/read request for a map segment for which trim processing is reserved, the memory controller 20 clears a trim flag in the TFB 203 to perform the trim processing and then perform write/read operation based on the command received from the host device HD. In addition, when there is no space in the journal storage area 210, the memory controller 20 suspends the start of processing a command that may clear a trim flag in the TFB 203, that is, a command to record a performance history in the journal storage area 210. Thereafter, when space is created in the journal storage area 210, the memory controller 20 starts to process the command that has been held (LUT updating and trimming).

[2-2] Backup Operation

Figure 9:
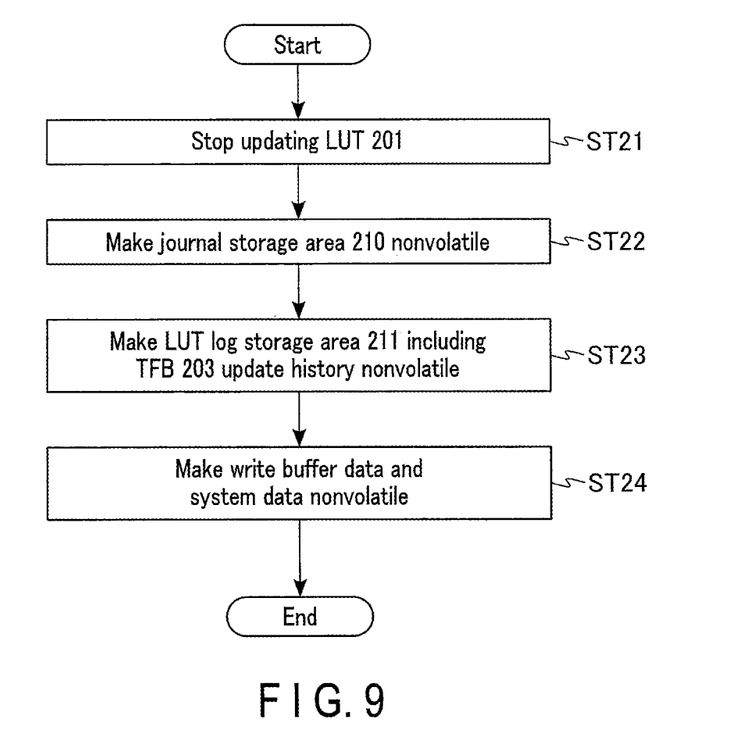
FIG. 9 is a flowchart showing an example of a backup operation of the memory controller according to the embodiment.

FIG. 9 is a flowchart showing an example of a backup operation of the memory controller 20 according to the embodiment. An example of the backup operation of the memory controller 20 according to the embodiment will be described below with reference to FIG. 9.

When the protection circuit 28 detects a power loss of the memory system MS, the memory controller 20 starts a backup operation using the PLP capacitor as a backup power source (Start).

When the memory controller 20 starts the backup operation, it stops updating the LUT 201 (step ST21). In step ST21, the memory controller 20 stops, for example, writing the write buffer data stored in the buffer memory 27 and recording a history.

The memory controller 20 then makes the journal storage area 210 nonvolatile (step ST22). That is, the memory controller 20 causes the system data storage area 102 of the nonvolatile memory 10 to store each entry of the journal storage area 210 including the change history of the LUT 201.

The memory controller 20 then makes the LUT log storage area 211 including the change history of the TFB 203 nonvolatile (step ST23). That is, the memory controller 20 causes the system data storage area 102 of the nonvolatile memory 10 to store each entry of the LUT log storage area 211 including the map segment write history, the change history of the TFB 203 and the like.

The memory controller 20 then makes the write buffer data and the system data nonvolatile (step ST24). The write buffer data to be nonvolatile in step ST24 is data not stored in the user data storage area 101 of the nonvolatile memory 10. The system data to be nonvolatile in step ST24 is data necessary for restoring the state of the memory system MS immediately before the power loss except for the LUT 201, host LUT 202 and TFB 203. The write buffer data and system data which are made nonvolatile in step ST24 are stored in the system data storage area 102 of the nonvolatile memory 10, for example.

When step ST24 is completed, the memory controller 20 terminates a series of steps shown in FIG. 9 (End). After that, the memory controller 20 terminates the operation performed using the PLP capacitor as a backup power supply and is powered off.

As described above, in the backup operation of the memory system MS according to the embodiment, when the power of the memory system MS is lost, system data, write buffer data, and the like necessary for restoring a state immediately before the power loss are saved in the nonvolatile memory 10. At the next power-on, the memory controller 20 reads information of each entry of the journal storage area 210 from the nonvolatile memory 10 and restores the state of the LUT 201 immediately before the power loss. The memory controller 20 also reads information of each entry in the LUT log storage area 211 from the nonvolatile memory 10, and restores the states of the host LUT 202 and the TFB 203 immediately before the power loss.

[3] ADVANTAGEOUS EFFECTS OF EMBODIMENT

In the memory system MS according to the embodiment, each entry of the LUT log storage area 211 which is made nonvolatile by the history recording operation includes information for restoring the state of the TFB 203. When the power of the memory system MS is lost, that is, when the memory system MS must be urgently powered off, each entry of the LUT log storage area 211 including the change history of the TFB 203 is made nonvolatile. When the memory system MS is powered on after the backup operation, the change history of the nonvolatile TFB 203 is reflected on the TFB 203 based on the change history storage order.

As a result, the memory system MS according to the embodiment can restore the state of the TFB 203 immediately before the power loss and can resume the trimming process after the first activation after the power loss. The memory system MS can thus improve in its reliability.

The memory system MS according to the embodiment also makes the change history of the TFB 203 (information concerning the setting/clearing of the trim flag) nonvolatile during the backup operation without making the TFB 203 nonvolatile as data concerning the restoration of the TFB 203. In other words, in the memory system MS, the nonvolatilization of the TFB 203 is omitted during the backup operation, and data necessary for restoring the state of the TFB 203 is compressed and made nonvolatile.

As a result, the memory system MS according to the embodiment can shorten the time required for nonvolatilization of data used for restoring the TFB 203 when the power of the memory system MS is lost. In other words, the memory system MS can reduce the processing time required for backup of the system data. Since, furthermore, data used for restoring the TFB 203 is compressed, the storage capacity of the nonvolatile memory 10 used in the backup operation can be suppressed. If the processing time for the backup operation is shortened, the memory system MS can reduce the capacity of the PLP capacitor and thus prevent the manufacturing costs of the memory system MS from increasing.

In addition, the memory system MS according to the embodiment makes it unnecessary to make a snapshot of the TFB 203 nonvolatile and also makes it unnecessary to make a map segment nonvolatile when the power of the memory system MS is lost. The memory system MS can improve in its write performance by increasing the number of nonvolatile map segments that can be held by the controller, instead of reducing the number of capacitors to be mounted.

[4] OTHERS

Some or all of the operations of the memory controller 20 may be performed by the CPU 23 executing firmware or by dedicated hardware provided in the memory controller 20.

The embodiment is exemplary and the scope of the invention is not limited to the embodiment.

The invention claimed is:

1. A memory system comprising:
a nonvolatile memory including a plurality of blocks; and
a memory controller configured to access to the nonvolatile memory in response to an instruction from a host device to manage write and erase of the nonvolatile memory and control a first table, a second table, a first storage area, and a second storage area, wherein
the first table is managed in units of map segments associated with at least one of the plurality of blocks and is used to acquire a physical address of any of the plurality of blocks using a logical address as an index,
the second table includes a plurality of first entries associated with a plurality of map segments included in the first table, and each of the first entries is a 1-bit entry indicating whether a trimming process for deleting invalid data is reserved for the associated map segments,
the first storage area is configured to store a change history of the first table,
the second storage area is configured to store a physical address of a block that is a storage destination of a copy of a changed map segment and a change history of the second table,
the memory controller is further configured to perform, after a power loss occurs, a backup operation to cause the nonvolatile memory to store a copy of the first storage area and a copy of the second storage area; and
the memory controller is further configured not to cause the nonvolatile memory to store a copy of the second table in the backup operation.

2. The memory system of claim 1, wherein:
the memory controller further includes a protection circuit which detects a configured to detect the power loss.

3. The memory system of claim 1, wherein the memory controller is further configured to read the copy of the first storage area and the copy of the second storage area from the nonvolatile memory when the memory controller starts first after the backup operation is performed, and to restore a state of the second table before the power loss based on a change history of the second table included in the read copy of the second storage area.

4. The memory system of claim 1, wherein:
the second storage area includes a plurality of second entries; and
the second entries each store a physical address of a block that is a storage destination of a copy of a first map segment included in the map segments includes information indicating whether information of a first entry associated with the first map segment is reset.

5. The memory system of claim 1, wherein:
upon receiving from the host device a command that notifies a second map segment included in the map segments that the trimming process is reserved, the memory controller is further configured to set first bit data to a first entry associated with the second map segment in the second table, and causes a single second entry in the second storage area to store information indicating that the first bit data is set to the first entry associated with the second map segment in the second table.

6. The memory system of claim 5, wherein the single second entry stores information indicating that the first bit data is set in two or more first entries.

7. The memory system of claim 6, wherein:
the two or more first entries are consecutive bits; and
the single second entry specifies the two or more first entries in a range.

8. The memory system of claim 1, wherein the first storage area has a storage capacity that is larger than a storage capacity of the second storage area.

9. The memory system of claim 1, wherein the first storage area and the second storage area are each a cyclic buffer.

10. A method for controlling a memory system, the memory system comprising a nonvolatile memory including a plurality of blocks, the method comprising:
controlling a first table, a second table, a first storage area, and a second storage area,
performing a backup operation after a power loss occurs, wherein
the first table is managed in units of map segments associated with at least one of the blocks and is used to acquire a physical address of any of the blocks using a logical address as an index,
the second table includes a plurality of first entries associated with a plurality of map segments included in the first table, and each of the first entries is a 1-bit entry indicating whether a trimming process for deleting invalid data is reserved for the associated map segments,
the first storage area is configured to store a change history of the first table,
the second storage area is configured to store a physical address of a block that is a storage destination of a copy of a changed map segment and a change history of the second table, and
the method further comprising:
causing the nonvolatile memory to store a copy of the first storage area and a copy of the second storage area in the backup operation, and
not causing the nonvolatile memory to store a copy of the second table in the backup operation.

11. The method of claim 10, wherein the memory system further includes a protection circuit configured to detect the power loss.

12. The method of claim 10, further comprising:
reading the copy of the first storage area and the copy of the second storage area from the nonvolatile memory when the memory system starts after the backup operation is performed, and restoring a state of the second table before the power loss based on a change history of the second table included in the read copy of the second storage area.

13. The method of claim 10, wherein:
the second storage area includes a plurality of second entries; and
the second entries each store a physical address of a block that is a storage destination of a copy of a first map segment included in the map segments includes information indicating whether information of a first entry associated with the first map segment is reset.

14. The method of claim 10, further comprising:
upon receiving from the host device a command that notifies a second map segment included in the map segments that the trimming process is reserved, setting first bit data to a first entry associated with the second map segment in the second table, and causing a single second entry in the second storage area to store information indicating that the first bit data is set to the first entry associated with the second map segment in the second table.

15. The method of claim 14, wherein the single second entry stores information indicating that the first bit data is set in two or more first entries.

16. The method of claim 15, wherein
the two or more first entries are consecutive bits; and
the single second entry specifies the two or more first entries in a range.

17. The method of claim 10, wherein the first storage area has a storage capacity that is larger than a storage capacity of the second storage area.

18. The method of claim 10, wherein the first storage area and the second storage area are each a cyclic buffer.

\* \* \* \* \*